June 7, 1932. G. DONALDSON 1,862,050
AUTOMATIC FILTERING APPARATUS
Filed Nov. 12, 1928 2 Sheets-Sheet 2
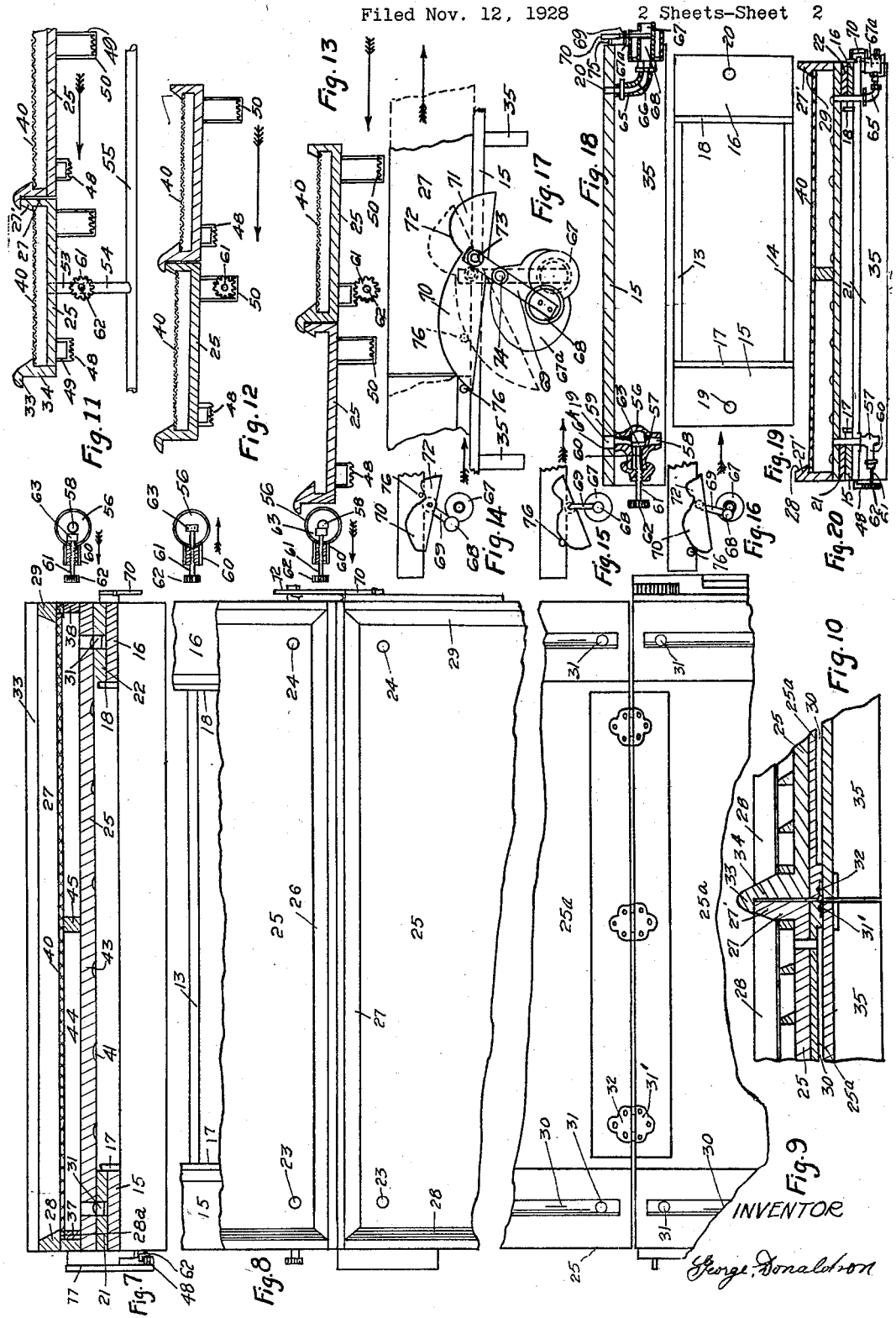
INVENTOR
George Donaldson Patented June 7, 1932

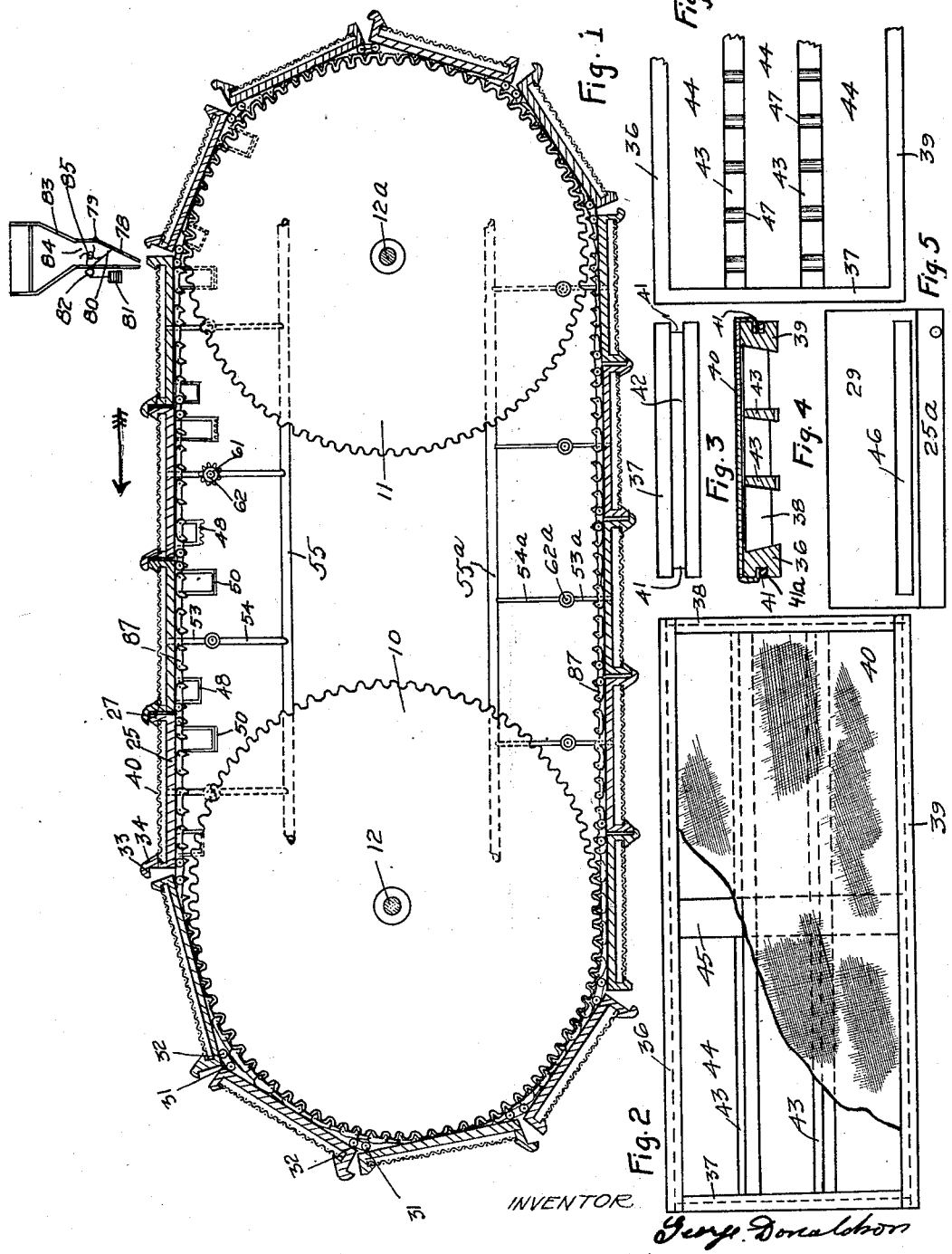

1,862,050

UNITED STATES PATENT OFFICE

GEORGE DONALDSON, OF INGLEWOOD, CALIFORNIA

AUTOMATIC FILTERING APPARATUS

Application filed November 12, 1928. Serial No. 318,984.

This invention relates to improvements in filtering or screening apparatus and has for its object to provide a simple, efficient and inexpensive arrangement of this character.

One of the objects of this invention is to facilitate the operation of extracting oil from volatile and compressible matter by the application of air as the extracting medium.

Another object of this invention is to provide a form of filtering apparatus characterized by the feature of successive operation of the filtering screens and continuous extraction of the oil thru the filtering apparatus.

A further object of this invention is to provide means in a filtering device for rapidly cleaning the filtering apparatus before same receives a fresh charge of matter from which oil or other fluid is to be extracted or expressed automatically.

A still further object of this invention is to provide a filtering apparatus designed to provide a rectilinear course of travel for the filtering screens or apparatus to the end that better control and accessibility of these screens may be had.

Another object of this invention is to provide an endless band to which a plurality of hingedly mounted filtering pans are associated for conjoint movement therewith, means being provided for causing the several pans to come into position opposite a suction apparatus for removing air and therefore oil or the like from the matter deposited upon the screen material mounted on the filtering pan.

A further object of this invention is to provide improved means for causing the several filtering pans to be cleaned and freed from obstructions that may tend to clog the screen surfaces thereof to the end that the oil extraction may proceed without hindrance when the suction making function of the device takes place.

A still further object of this invention is to provide, in an automatic filtering apparatus a platform upon which the upper and lower stretches of an endless band are caused to be guided rectilinearly, to come within range of a successive series of stations, each station having an air expelling or an air conducting pipe for sucking air out of the filtering pans or blowing air into the meshes thereof for cleaning purposes.

Another object of this invention is to provide, in an automatic filtering apparatus means whereby the leakage of air between the coinciding end walls of the mated and hinged filtering pans, or over the top parts thereof is effectively prevented.

A further object of this invention is to save air from being wasted especially in close vicinity of the coinciding end walls of mated pans, in the provision of mechanism for controlling the exact times of inducing the suction of air into as well as stopping the flow of air out of the several pans.

A further object of this invention is to provide an improved screen body for removable engagement in the filtering pan serving to effectively stretch the filtering material or screen upon the frame thereof.

And a still further object of this invention is to provide interchangeable types of valves for admitting air into the air pipes employed either to suck oil from the material to be filtered or for blowing air under pressure into the meshes of the screening or filtering material as may be found necessary or desirable in the act of cleaning the filtering pans.

Another object of this invention is to provide controls for the air valves forming part of this invention, and in mounting these controls upon the ends of the pans whereby the pans, in the course of movement to position when suction is to take place, or cleaning of the screens effected, will actuate the opening and successive closing of the valves, the closing of the valves being effected just prior to the seamed section of mated filtering pans coming close to the suction pipes.

With the above and other objects in view my invention consists in the combination, arrangement and details of construction disclosed in the drawings and specifications and then more particularly pointed out in the appended claims.

In the drawings, wherein similar reference numerals indicate similar parts throughout the appended views, Figure 1 is a vertical sectional elevation of various parts of my invention in proper assembly, Figure 2 is a top plan view of a screen apparatus, partly broken away, Figure 3 is an end elevation of the screen apparatus, Figure 4 is a cross sectional elevation of the screen, Figure 5 is an end elevation of a filtering pan showing the entrance slot for the screen, Figure 6 is a fragmental bottom plan view of the screen, Figure 7 is a longitudinal sectional view of a platform showing the mounting of a filtering pan thereupon, Figure 8 is a fragmental top plan view of two mated filtering pans, Figure 9 is a fragmental bottom plan view of the parts shown in Figure 8, Figure 10 is a fragmental sectional elevational view showing two mated filtering pans, Figure 11 shows a diagrammatic view of two filtering pans with valve regulating means in neutral position, also showing a view of the movable parts internally of the valve, Figure 12 is a view similar to Figure 11 but showing the pan valve regulating means about to fully function, the valve being in process of closing, Figure 13 is another view similar to Figure 11 but showing the filtering pans in a position where the valve is being gradually opened, Figure 14 is a fragmental end view of the filtering pan showing one type of air valve operated by the pan, this view showing a different type of valve than that shown in Figure 11 but in the same position as to its internal parts.

Figure 15 is a view similar to Figure 14, showing the position of valve parts corresponding to the position of the valve parts in Figure 12, Figure 16 is a view of the modified valve showing corresponding positions for its internal parts as is shown in the type of valve disclosed in Figure 13.

Figure 17 is an end elevation of a filtering pan showing in full lines the valve open and in dotted lines the same valve closed.

Figure 18 is a longitudinal sectional view of the platform showing interchangeable operable valves at the opposing ends thereof, Figure 19 is a top plan view of the platform to be described and Figure 20 is a longitudinal sectional view of the platform and filtering pan disclosing in section the valves disclosed in Figure 19.

In the drawings, which are merely illustrative of my invention the various parts of my invention are disclosed. An endless band is provided set in motion by means of the gears or sprockets 10 and 11 mounted respectively upon the shafts 12, 12a as is shown plainly in Figure 1. These gears will be secured upon any suitable frame, not shown. A sprocket chain composed of the links 87 is provided for motion upon the sprockets 10 and 11 by means of which the band, composed of these links, is set in motion.

A suitable platform is designed to be supported by any desirable means in a horizontal plane and it consists of the longitudinal bars or sills 13 and 14 Fig. 19 upon the opposite sides of which are secured the rails 15 and 16 flanked by the pair of confronting upstanding guard walls 17 and 18 respectively. It will be understood that this platform will extend at a considerable length so as to provide an undersupport for the upper stretch of the sprocket chain, while another and similar platform will extend immediately above the lower stretch of the same sprocket chain or band.

A series of filtering pans are provided and extend completely around the endless band or chain by which they are set in motion. A pair of oppositely arranged transversely extending bars 21 and 22 are carried by the underside of each pan and these bars are slidably guided upon the tracks 15 and 16 of the platform being restrained against lateral displacement from the platform by the guide walls 17 and 18 of the tracks. Several pans are designed at the same time to be moved rectilinearly over and upon this platform.

Formed at the opposite sides of the platform, at spaced apart points are the air ports 19 and 20, Figs. 18 and 19, one pair of alining air ports for each pan. The bottom wall 25 of each pan is formed at opposite ends with the air ports 23 and 24 which communicate with the longitudinally extending grooves 30 Fig. 9 flanking the bars 21, 22 of the pans, 25a designating the surface immediately overlying the said grooves; air ports 31 are cut thru the grooves receiving air from valve fittings hereinafter more particularly set forth.

Each filtering pan besides having the bottom wall 25 is composed of the side walls 26 and 27 and the end walls 28, 29, the end walls 29 being formed with transverse slots 46 Fig. 5 for the slidable reception of the screen frames soon to be described. The inner faces of the end walls 28, 29 Fig. 7 are beveled for the purpose of clearance; shoulders 28a are formed upon the side and end walls extending at right angles to the main sides and providing grooves for the retaining reception of the screen frames soon to be described.

It will particularly be noted that one wall of each filtering pan is formed higher than the other side wall and has an integral stem 34 terminating in a laterally projecting nose 33 having an under edge disposed at right angles to this wall for overlapping engagement, as shown in Figure 10, with the flat upper edge of the side wall of the next adjacent and mated filtering pan, so when one filtering pan is closed upon the other this nose will overlap the edge of the adjacent coinciding pan wall and thus bar escape of air from between the seam formed by the coinciding walls of the pans in an upward direction.

The screen frame carrying the filtering or screen material 40 Fig. 2 consists of the longitudinal bars 36, 39 and the end bars secured to the side bars designated 37, 38 with an intermediate cross bar 45 for reinforcing purposes and with longitudinally extending spaced apart sills 43 formed with one side perpendicular to the upper edges of the bars and the other side inclined with respect to the perpendicular. The longitudinal bars and end bars have exterior grooves respectively designated in Figure 3 41, and 42 respectively. When now the filtering cloth 40 of proper meshing capacity is laid across the effective top area of this screen frame the marginal portions thereof may be forced into the grooves, 41, 42 and secured therein, after the material shall have been drawn taut, by means of the battens 41a wedged into secure position within these grooves. The spaces 44 intervene between the sills 43 and the walls 36, 39 thru which air may be drawn out or blown in. The several filtering pans are interconnected together hingedly by means of the hinge leaves 31', 32 respectively secured upon the said filtering pans.

Each screen frame will be introduced thru the slot 46 of the particular filtering pan it is reserved for, and will be accommodated under the shoulders 28a of the four walls comprising the pan. The under edges of the longitudinal sills 43 of each screen frame may be formed with the flutes 47 if desired (shown in Figure 6) for the better circulation of air from one space 38 to another of the cellular-built screen frame. The cells are designated broadly 44. The particular surface of the side wall of each pan designed to be surmounted by the nose projection of an adjacent wall is designated 27'.

Means are provided for regulating the suction thru the several filtering pans. It will be understood that the same platforms function in connection with the lower as well as the upper stretches of the endless band to which the pans are attached.

The platforms are provided with lateral sills 35 as a convenient under support for the same. In order to prevent the escape of air and to conserve the air supply against waste mechanisms are provided to shut the air off at a predetermined time, in the course of rectilinear travel of the several pans beneath the platform. If a suction takes place it will, however, be destroyed when the jointed seams of mated pans coming within reach of the suction openings of the suction apparatus since if the suction is not stopped considerable air will be consumed needlessly without doing work due to the escape of air around the coinciding edges or faces of the interconnected pans.

Two interchangeably serviceable types of valve mechanism are disclosed; since there are air ports on the bottom platform at the opposing sides of each pan and suction ports at upper platform two sets of valves are needed to control in one instance, the air ports, and in the other instance, the suction ports. Since either valve can be used equally well one valve could be located at one side of each pan and the other located at the other side thereof although the same type of valve could be used on both sides alike. In one type of valve construction two horizontally extending rack bars 48 and 50 depend from the lower portions of each filtering pan in the space between the opposing tracks of the platform. The frame parts 49 secure the rack bars in proper spaced relation below the bottom walls of the respective pans, the rack bar 48 being located at one end and the rack bar 50 at the opposite end of the same pan, the latter rack bar extending in a lower plane than the former rack bar 48.

Each set of rack bars is designed to engage, control and actuate the valves now to be described. The platform provides virtually a series of separate stations in conjunction with each of which a rotary gear 62 is provided mounted upon the shaft 61, this stem or shaft 61 being tapped into suction pipes 53 which connect with the ports 19, 20, and 31 of the pans.

The lower ends of the suction pipes 53 are designated 54 and connect with an air suction pipe 55 connected to all air pipes. Inside the suction pipes 53 are disposed restricted ports 58 in walls 56 extending transversely therein for the admission of air thereinto. The stem 61 carries a plug 63 for closing the ports 58, and the stem is threaded into the stopper 60 connected laterally to the pipes 53. Thus when the gear 62 is operated and rotated it turns the threaded stem 61 which causes the plug 63 to advance or recede according to the direction of movement or rotation of this gear.

Now when the several filtering pans are set in motion by means of the endless chain, they move rectilinearly upon the platform in the direction of the arrow shown in Figure 1. The air is to be sucked out of each pan in turn and as there are several pans resting upon the full length of each platform at the same time it will be seen that several gears 62 arranged at the several platform stations are to be simultaneously operated. In the order of successive operation, in moving in a counterclockwise direction, the pans will cause the rack bars 48 to operate the valve plugs 63 first to open the suction pipes 53, to cause a suction to take place in the particular pan in question. This rack bar 48 will mesh with the upper set of teeth of the gear 62, so will rotate this gear in one direction effective to uncover the port 58 in the valve chamber of pipe 53. Figure 13 shows the port 58 being gradually opened as the rack bar 48 engages gear 62. As the pan continues to move forward, the rack bar 48 moves beyond and out of engagement with the gear 62 and soon the other rack bar 50 will engage the lower set of teeth on the same gear 62. This is shown in Figure 12. It will be seen that the rear end of one pan and the front end of the mated next adjacent pan are about to pass over the suction ports of the platform, and as it is desired not to allow air to be drawn out at this time, when the rack bar 50 does mesh with the gear 62 the valve plug 63 will close the valve port 58 so no air is now sucked out from pan.

This operation is repeatedly carried out with the successive pans as several pans are controlling, at the same time, the opening and closing of the valve chambers of many air pipes. Whenever suction takes place it draws thru the meshes of the filtering cloth on each filtering pan the liquid, oil or other volatile matter of the material lodged and resting upon the filtering cloth. The oil thus extracted passes out of the pipes 54 into and thru the main suction pipes 55 and thence is carried away to some collection receptacle.

Located with air pipes extending downwardly towards the lower stretch of the endless band, are gears 62a controlling valves of the same general type already described while the pipes 53 are suction pipes to draw off by vacuum the foreign particles that may clog or obstruct the meshes of the filtering material. Instead of air sucking thru the filtering pans thru pipes 53a, the air is blown thereinto, the air blowing thru the filtering material and causing the matter clinging thereto to be removed from the material so the material removed in this manner may disappear from the pan and be received in any suitable receptacle lodged underneath the lower stretch of the endless band.

Another type of valve is provided for accomplishing the opening and closing of the valve mechanism. For this purpose each pan carries a pin 76 projecting from its side wall and on the platform is located a special valve fitting consisting of elbow 65 having connection with the air ports 19 or 20 or with both air ports, this elbow connecting with the main valve chamber 67 in which the valve port 68 allows or disallows air to enter thru the valve fitting to the proper ports of the pan for air suction. The line of travel of the air from valve chamber is designated 67 and of and into the elbow is designated 66 and thus air may be blown into or sucked out of each pan. A disk valve 68 is provided for the purpose of closing the valve port 67 and is carried at the lower end of a lever 69. The disk 68 passes operatively thru an opening in the valve fitting 67, and the lever 69 is fulcrumed on a pivot 74 connected to the valve fitting while the free end of this lever is secured rigidly by a pin 73 to a cam member having the large cam portion 70 and the small cam portion 72, the cam itself being designated 71. This cam is designed to actuate the valve disk 68 to open or closed position.

In operation as the pan moves in the direction indicated by the arrow in Figure 17, the pin 76 moves along with it in a straight line; at the proper time, when it is necessary to open the valve disk 68 to cause it to move away from the valve port 67 it controls, the pin 76 will ride upon the small cam 72 of cam member 71, depress this portion of the cam member as shown in Figure 14 to the right, thereby tilting the lever 69, moving its upper free end down and the disk carrying end upwardly, thereby uncovering the valve port 67. The next time the pin comes into engagement with the same cam member it engages the large cam 70 thereof, depresses this cam and allows the lever to operate to close the air port. This operation of the valves occurs automatically. When suction takes place in any particular filtering pan the air sucked out has a wide surface to pass thru carrying the oil along with it, the various cells of the screen frame allowing free passage of the air and carrying in the wake of this expelled air the oil or whatever is to be filtered out.

For loading material upon each pan in succession a hopper is provided consisting of the hopper 83, having a throat 84 communicating with a discharge spout whose mouth is variably controlled by a damper 78, hinged to the hopper as at 79, there being an agitator of approved design designated 85 for feeding the material along. A string 80, connected to the damper 78 is impelled under influence of a weight 81 and pulley 82 to set the damper in any position desired. I do not limit myself to the exact details of construction herein disclosed but claim all variations falling in purview of appended claims.

What I desire to claim and secure by Letters Patent is:—

1. A device as described consisting of an endless band, means setting said band in motion, a series of straight pans arranged in a connected series upon said band and moving therewith, a fixed platform over which a plurality of pans move rectilinearly progressively, said pans and said platform having a series of registerable ports, a suction device having outlet pipes connected to the platform ports, screens on the several pans, valves carried by said suction device, and means controlled by said pans severally for opening and closing said valves automatically to time the operation of the suction device.

2. A device as described consisting of an endless band, a series of screen covered, interconnected pans, means causing said pans to travel in unison with said endless band, said pans each having a port, a main pipe disposed between the stretches of the band, pipes connected to said main pipe at spaced apart points, a stationary platform directly underneath having tracks for the individual pans to move rectilinearly, said platform having ports communicating with the interior of the pans and with which the said suction pipes communicate, valves carried by said pipes, and means disposed in pairs for successively operating said valves to open and close the pan ports to bar or permit the passage of fluid therethru.

In witness whereof he has hereunder set his hand this 29th day of September, 1928.

GEORGE DONALDSON.